US012353231B2

(12) United States Patent
Sharma et al.

(10) Patent No.: US 12,353,231 B2
(45) Date of Patent: Jul. 8, 2025

(54) LOW-DROPOUT REGULATOR CIRCUIT WITH DYNAMIC TRANSITION BETWEEN OPERATION MODES

(71) Applicant: Apple Inc., Cupertino, CA (US)

(72) Inventors: Gaurav Sharma, Cupertino, CA (US); Nathan F. Hanagami, Cupertino, CA (US); Mahir Uka, Nabern (DE); Benedikt Wolf, Nabern (DE)

(73) Assignee: APPLE INC., Cupertino, CA (US)

( * ) Notice: Subject to any disclaimer, the term of this patent is extended or adjusted under 35 U.S.C. 154(b) by 184 days.

(21) Appl. No.: 17/947,472

(22) Filed: Sep. 19, 2022

(65) Prior Publication Data

US 2024/0094753 A1 Mar. 21, 2024

(51) Int. Cl.
*G05F 1/46* (2006.01)
*G05F 1/575* (2006.01)

(52) U.S. Cl.
CPC .............. *G05F 1/575* (2013.01); *G05F 1/461* (2013.01); *G05F 1/462* (2013.01); *G05F 1/468* (2013.01); *G05F 1/46* (2013.01)

(58) Field of Classification Search
CPC . G05F 1/46; G05F 1/461; G05F 1/462; G05F 1/468; G05F 1/56; G05F 1/575; G05F 1/595; G05F 1/625; H02M 1/0045; H02M 3/158
See application file for complete search history.

(56) References Cited

U.S. PATENT DOCUMENTS

| | | | | |
|---|---|---|---|---|
| 9,454,164 | B2 | 9/2016 | Bhattad | |
| 10,444,780 | B1 | 10/2019 | Cheng et al. | |
| 10,545,523 | B1 * | 1/2020 | Wu | G05F 1/565 |
| 10,866,606 | B2 | 12/2020 | Hu | |
| 2010/0259235 | A1 * | 10/2010 | Ozalevli | G05F 1/56 323/274 |
| 2021/0124383 | A1 * | 4/2021 | Iguchi | G05F 1/565 |
| 2022/0019253 | A1 * | 1/2022 | Zukowski | G05F 1/468 |
| 2022/0035393 | A1 * | 2/2022 | Hafizi | G05F 1/59 |

* cited by examiner

*Primary Examiner* — Thienvu V Tran
*Assistant Examiner* — Shahzeb K Ahmad
(74) *Attorney, Agent, or Firm* — Sterne, Kessler, Goldstein & Fox P.L.L.C.

(57) ABSTRACT

A low-dropout (LDO) regulator circuit with dynamic transitioning between first and second operation modes. The LDO regulator circuit includes an operational amplifier with a first input connected to a reference voltage, a feedback circuit connected between a second input of the operational amplifier and an output of the LDO regulator circuit, and a pass transistor selectively coupled to the feedback circuit and an output of the operational amplifier via a set switches controlled by a switch mode enable signal. The LDO regulator circuit transitions between the first and second operation modes responsive to one or more changes of the switch mode enable signal. In the first operation mode, a load voltage at the output of the LDO regulator circuit has a first voltage value that depends on the reference voltage. In the second operation mode, the load voltage has a second voltage value independent from the reference voltage.

21 Claims, 11 Drawing Sheets

LOW-DROPOUT REGULATOR CIRCUIT WITH DYNAMIC TRANSITION BETWEEN OPERATION MODES

BACKGROUND

1. Field of the Disclosure

The present disclosure relates to a circuit for voltage regulation, and more specifically to a low-dropout (LDO) regulator circuit with a dynamic transition between operation modes.

2. Description of the Related Arts

LDO regulators provide a regulated output voltage that is powered by a higher input voltage (e.g., supply voltage) for a variety of applications, such as powering sensitive analog devices, extending battery life, etc. LDO regulators typically operate in one of two operation modes. In a regulation/LDO mode, the regulated output voltage is a function of a reference voltage that is independent of a higher input voltage (e.g., supply voltage). In a bypass/switch mode, the LDO regulator operates as a switch and the regulated output voltage mirrors the input voltage. A LDO regulator enters the bypass/switch mode when, e.g., wanting to enter the sleep state to reduce power consumption, or when deciding that the bypass/switch mode is a preferred mode based on available headroom/quiescent current. However, transition between the regulation/LDO mode and the bypass/switch mode typically result in significant undershoot or overshoot in the regulated output voltage. This problem is even more challenging at high load currents (e.g., at high loads).

SUMMARY

Embodiments relate to a low-dropout (LDO) regulator circuit that can smoothly transition between different operation modes without undershoot/overshoot in a regulated load voltage (output voltage). The LDO regulator circuit includes an operational amplifier with a first input connected to a reference voltage, a feedback circuit connected between a second input of the operational amplifier and an output of the LDO regulator circuit, and a pass transistor selectively coupled to the feedback circuit and an output of the operational amplifier via a plurality of switches controlled by a switch mode enable signal. The feedback circuit is configured to form a feedback loop in the LDO regulator circuit. The LDO regulator circuit transitions between a first operation mode and a second operation mode responsive to one or more changes of the switch mode enable signal. In the first operation mode, a load voltage at the output of the LDO regulator circuit has a first voltage value that depends on the reference voltage. In the second operation mode, the load voltage has a second voltage value independent from the reference voltage.

Figure 1:
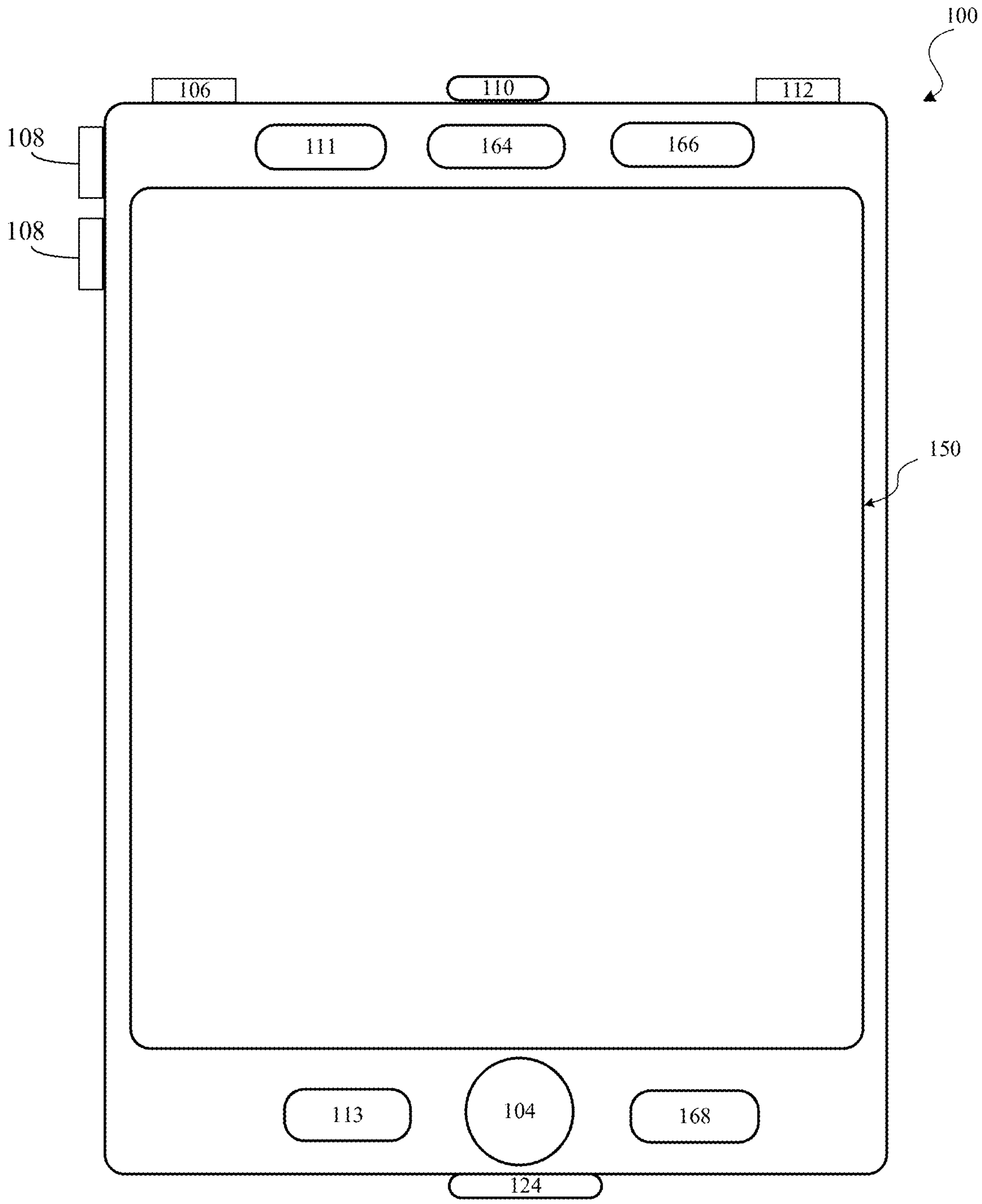
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a low-dropout (LDO) regulator circuit for regulating an output voltage (e.g., load voltage). The LDO regulator circuit presented herein can smoothly transition between a first operation mode (e.g., regulation/LDO mode) and a second operation mode (e.g., bypass/switch mode) without an overshoot/undershoot in the regulated output voltage. The LDO regulator circuit presented herein includes an operational amplifier connected to a reference voltage, a feedback circuit connected between the operational amplifier and an output of the LDO regulator circuit, a pass transistor selectively coupled to the feedback circuit, and multiple switches controlled by a switch mode enable signal. A drain electrode of the pass transistor is connected to an input voltage (e.g., supply voltage), and a source electrode of the pass transistor is connected to the output of the LDO regulator circuit. In the first operation mode (e.g., regulation/LDO mode), a gate electrode of the pass transistor is connected to the feedback circuit and the output voltage is a function of the reference voltage and a feedback factor of the feedback circuit. In the second operation mode (e.g., bypass/switch mode), the gate electrode of the pass transistor is disconnected from the feedback circuit and a fixed voltage is applied to the gate electrode of the pass transistor. This causes the output voltage to become substantially same as the input voltage. The LDO regulator circuit transitions between the first operation mode and the second operation mode in response to one or more changes in the switch mode enable signal applied to the switches. In one or more embodiments, the switch mode enable signal is generated by a dropout detector circuit coupled to the operational amplifier and the feedback circuit when the dropout detector circuit detects a dropout in the output voltage.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, image sensors 164 may be associated with different lens configuration. For example, device 100 may include rear image sensors, one with a wide-angle lens and another with as a telephoto lens. Device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100. Device 100 may perform various operations including image processing.

Figure 2:
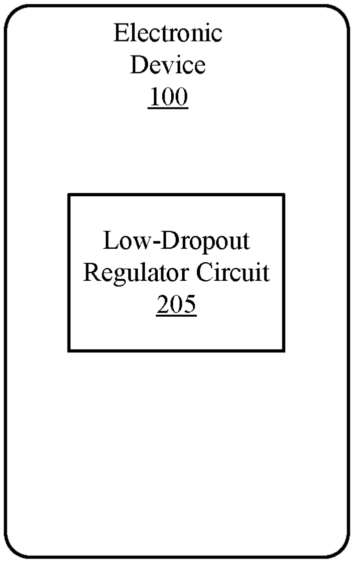
FIG. 2 is a block diagram illustrating the electronic device with a low-dropout (LDO) regulator circuit, according to one embodiment.

FIG. 2 is a block diagram illustrating device 100 with a LDO regulator circuit 205, according to one embodiment. Device 100 may include other components that are not illustrated in FIG. 2. LDO regulator circuit 205 may provide a regulated output voltage (e.g., load voltage) that is powered from a higher input voltage (e.g., supply voltage). The regulated output voltage may be provided from LDO regulator circuit 205 to one or more other components of device 100. LDO regulator circuit 205 may dynamically transition between a regulation/LDO mode and a bypass/switch mode without undershoot/overshoot in the output voltage, even at high load currents. Details about a structure and operations of LDO regulator circuit 205 are provided below in relation to FIGS. 3A through 9.

Example Low-Dropout Regulator

Figure 3A:
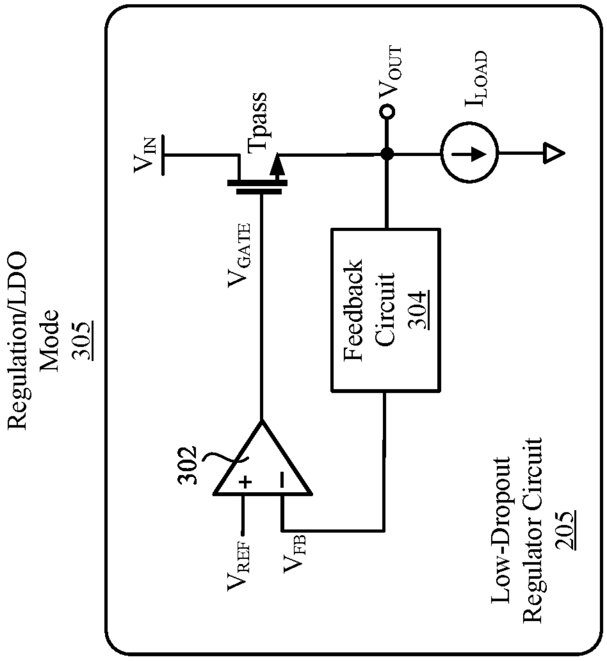
FIG. 3A is a circuit diagram of a LDO regulator circuit operating in a regulation/LDO mode, according to one embodiment.

FIG. 3A is a circuit diagram of LDO regulator circuit 205 operating in a regulation/LDO mode 305, according to one embodiment. In the regulation/LDO mode 305, LDO regulator circuit 205 operates via an operational amplifier 302, a feedback circuit 304, and a pass transistor, Tpass, coupled to feedback circuit 304 and an output of operational amplifier 302. The pass transistor, Tpass, may be an N-type metal-oxide-semiconductor (NMOS) transistor. The pass transistor, Tpass, may, in various embodiments, be implemented as a metal-oxide semiconductor field-effect transistor (MOSFET), a fin field-effect transistor (FinFET), a gate-all-around field-effect transistor (GAAFET), or any other suitable transistor device. A drain electrode of the pass transistor, Tpass, may be connected to a supply voltage (or input voltage), $V_{IN}$, and a source electrode of the pass transistor, Tpass, may be connected to an output of LDO regulator circuit 205. A load current, LOAD, flows through the output of LDO regulator circuit 205. A quiescent current (IQ) of LDO regulator circuit 205 operating in regulation/LDO mode 305 is kept low, e.g., approximately equal to 15 μA. A quiescent current (IQ) is the current required to power internal circuitry of LDO regulator circuit 205 when the load current, $I_{LOAD}$, is zero.

A first input of operational amplifier 302 may be connected to a reference voltage, $V_{REF}$. Feedback circuit 304 may be connected between a second input of operational amplifier 302 and an output of LDO regulator circuit 205, and feedback circuit 304 may be configured to form a feedback loop in LDO regulator circuit 205. Thus, a voltage, $V_{GATE}$, at a gate electrode of pass transistor, Tpass, may be controlled by the feedback loop. As a voltage $V_{FB}$ produced by feedback circuit 304 is the same as the reference voltage, $V_{REF}$, an output voltage, $V_{OUT}$, of LDO regulator circuit 205 is given as $V_{REF}/K$, where K is a feedback factor of feedback circuit 304.

Figure 3B:
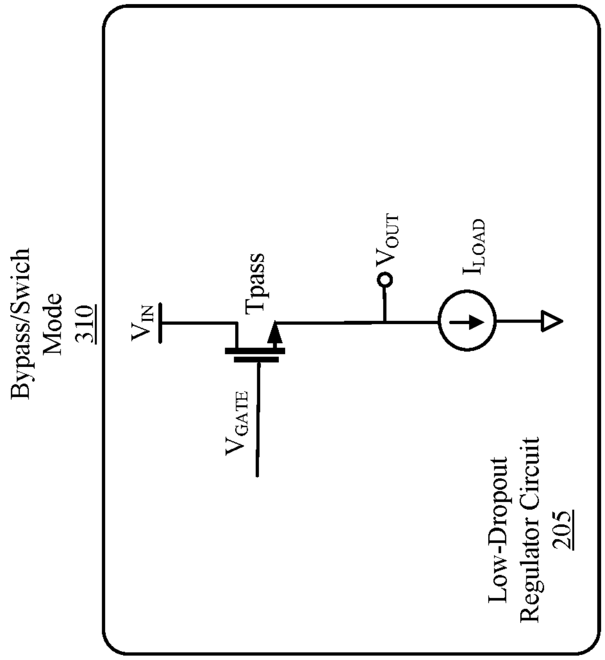
FIG. 3B is a circuit diagram of a LDO regulator circuit operating in a bypass/switch mode, according to one embodiment.

FIG. 3B is a circuit diagram of LDO regulator circuit 205 operating in a bypass/switch mode 310, according to one embodiment. In the bypass/switch mode 310, LDO regulator circuit 205 operates only via the pass transistor, Tpass, that generates the load current, $I_{LOAD}$, and the output voltage, $V_{OUT}$. In the bypass/switch mode 310, feedback circuit 304 is disconnected from the pass transistor, Tpass, and a fixed voltage, $V_{GATE}$ is applied to the gate electrode of the pass transistor, Tpass, which makes LDO regulator circuit 205 to work as a switch. The output voltage, $V_{OUT}$, may be given by $V_{IN}-I_{LOAD}*R_{SW}$, where $R_{SW}$ is a resistance of the pass transistor, Tpass. Since $I_{LOAD}*R_{SW}<<V_{IN}$, then the output voltage, $V_{OUT}$, may be substantially same as the supply voltage (input voltage), $V_{IN}$. A quiescent current (IQ) of LDO regulator circuit 205 operating in the bypass/switch mode 310 may be low, e.g., approximately equal to 5 μA.

Figure 4:
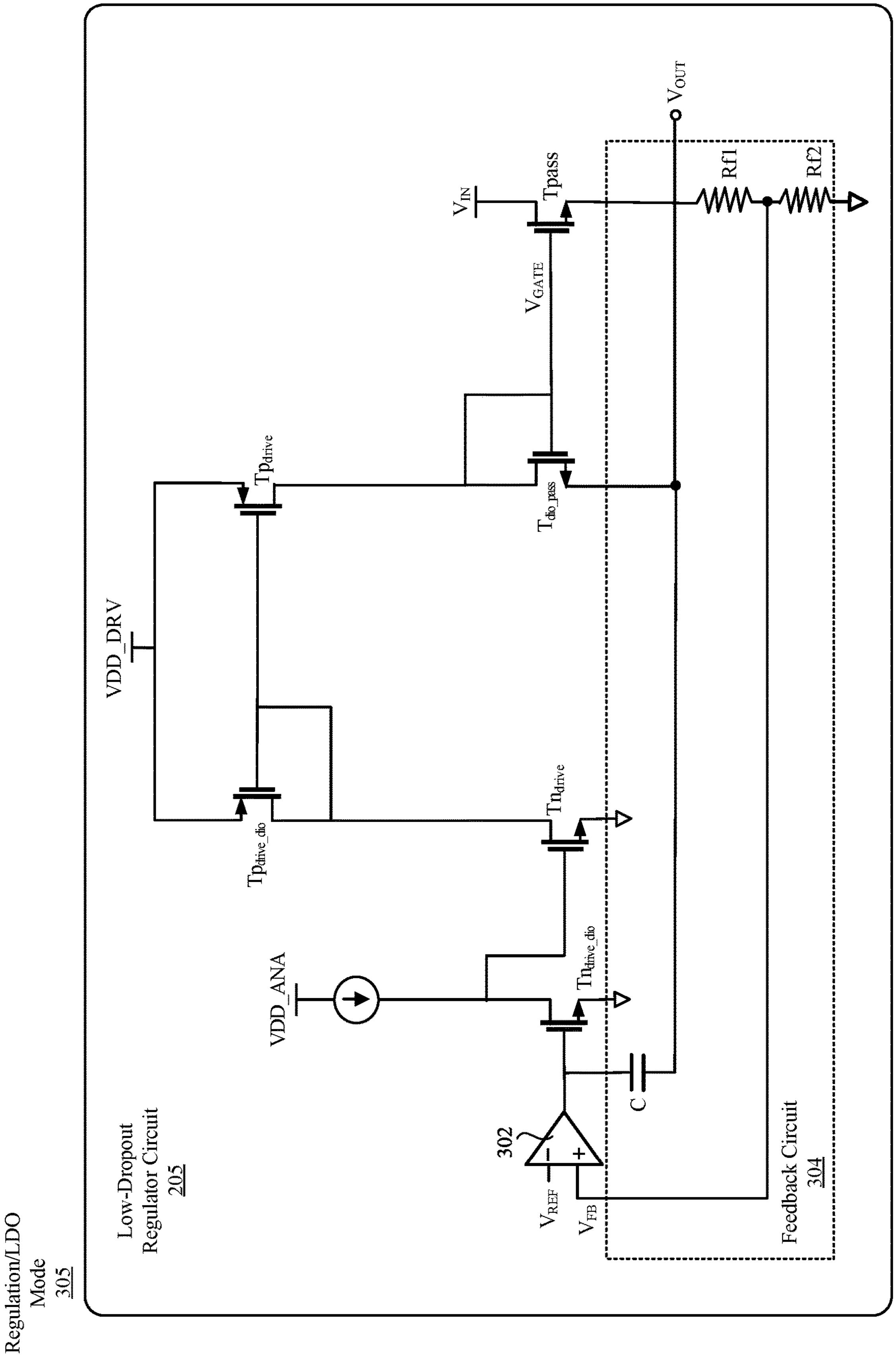
FIG. 4 is an example detailed circuit diagram of a LDO regulator circuit, according to one embodiment.

FIG. 4 is an example detailed circuit diagram of LDO regulator circuit 205 operating in regulation/LDO mode 305, according to one embodiment. Unlike in the simplified circuit diagram of LDO regulator circuit 205 in FIG. 3A, the gate electrode of the pass transistor, Tpass, is not directly connected to the output of operational amplifier 302. Instead, driving circuitry that include a pair of NMOS transistors (e.g., $Tn_{drive\_dio}$ and $Tn_{drive}$ transistors) and a P-type metal-oxide-semiconductor (PMOS) transistor (e.g., $Tp_{drive\_dio}$ transistor) forming a current source may be directly connected to the output of operational amplifier 302. A current generated by the driving circuitry may be mirrored via a PMOS transistor (e.g., $Tp_{drive}$ transistor) and applied to the gate electrode of the pass transistor, Tpass, via a NMOS transistor (e.g., $T_{dio\_pass}$ transistor) to generate the gate voltage, $V_{GATE}$. As the feedback voltage, $V_{FB}$, generated by feedback circuit 304 controls an output voltage of operational amplifier 302 (which is effectively an input voltage of the driving circuitry), the voltage, $V_{GATE}$, at the gate electrode of pass transistor, Tpass, may be controlled by a feedback loop in LDO regulator circuit 205 formed by feedback circuit 304. Transistors in LDO regulator circuit 205 of FIG. 4 may, in various embodiments, be implemented using MOSFETs, FinFETs, GAAFETs, or any other suitable transistor devices.

As shown in FIG. 4, feedback circuit 304 may include a pair of resistors Rf1, Rf2 coupled to the output of LDO regulator circuit 205. The pair of resistors Rf1, Rf2 form a voltage divider to generate a feedback voltage, $V_{FB}$, as a function of the output voltage, $V_{OUT}$, providing that the feedback factor K equals to Rf2/(Rf1+Rf2). As the feedback voltage, $V_{FB}$, is the same as the reference voltage, $V_{REF}$, then $V_{OUT}=V_{REF}/K$. Feedback circuit 304 may also include a capacitor, C, connected between the output of operational amplifier 302 and the output of LDO regulator circuit 205 e.g., to further stabilize the output voltage, $V_{OUT}$.

Figure 5A:
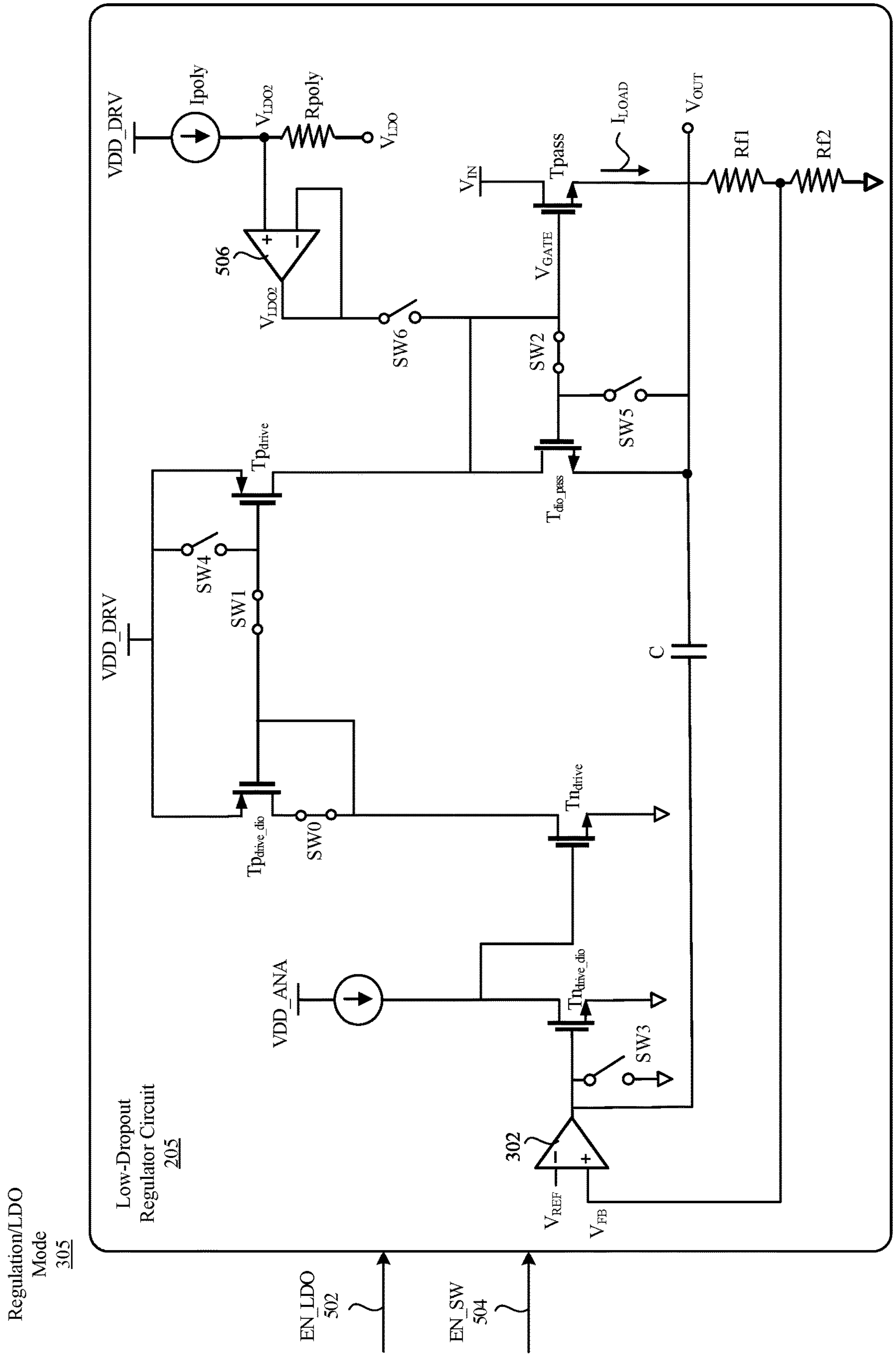
FIG. 5A is a circuit diagram illustrating a multi-mode LDO regulator circuit operating in a regulation/LDO mode, according to one embodiment.

FIG. 5A is a circuit diagram illustrating multi-mode LDO regulator circuit 205 operating in regulation/LDO mode 305, according to one embodiment. Multi-mode LDO regulator circuit 205 in FIG. 5A may include the same components as LDO regulator circuit 205 in FIG. 4. Additionally, multi-mode LDO regulator circuit 205 in FIG. 5A may include multiple switches (e.g., switches SW0 through SW6), and a current source Ipoly coupled to a resistor Rpoly and an operational amplifier 506. However, in regulation/LDO mode 305, the current source Ipoly and operational amplifier 506 are disconnected from the rest of circuitry of LDO regulator circuit 205 (e.g., due to an "OFF" state of switch SW6). The current source Ipoly and operational amplifier 506 are connected to the rest of circuitry of LDO regulator circuit 205 in bypass/switch mode 310, as described below in relation to FIG. 5B. Switches SW0 through SW6 may, in various embodiments, be implemented using MOSFETs, FinFETs, GAAFETs, or any other suitable switching devices.

The configuration of multi-mode LDO regulator circuit 205 in FIG. 5A for operation in regulation/LDO mode 305 is achieved through a proper state of each switch SW0 through SW6. The state of each switch SW0 through SW6 may be controlled by a switch mode enable signal, EN_SW 504. Each change in the switch mode enable signal, EN_SW 504, may initiate dynamic transition of multi-mode LDO regulator circuit 205 from bypass/switch mode 310 to regulation/LDO mode 305 and vice versa, as also shown in timing diagrams of FIG. 6A and FIG. 6B. The switch mode enable signal, EN_SW 504, may be a bit signal that can have a defined low voltage value (e.g., representing the bit value of "0") and a defined high voltage value (e.g., representing the bit value of "1"). The switch mode enable signal, EN_SW 504, may be generated by a component of device 100 separate from multi-mode LDO regulator circuit 205. Alternatively, the switch mode enable signal, EN_SW 504, may be generated by an additional circuit that is part of multi-mode LDO regulator circuit 205 (e.g., as described in detail below in relation to FIG. 7 and FIG. 8).

Figure 6A:
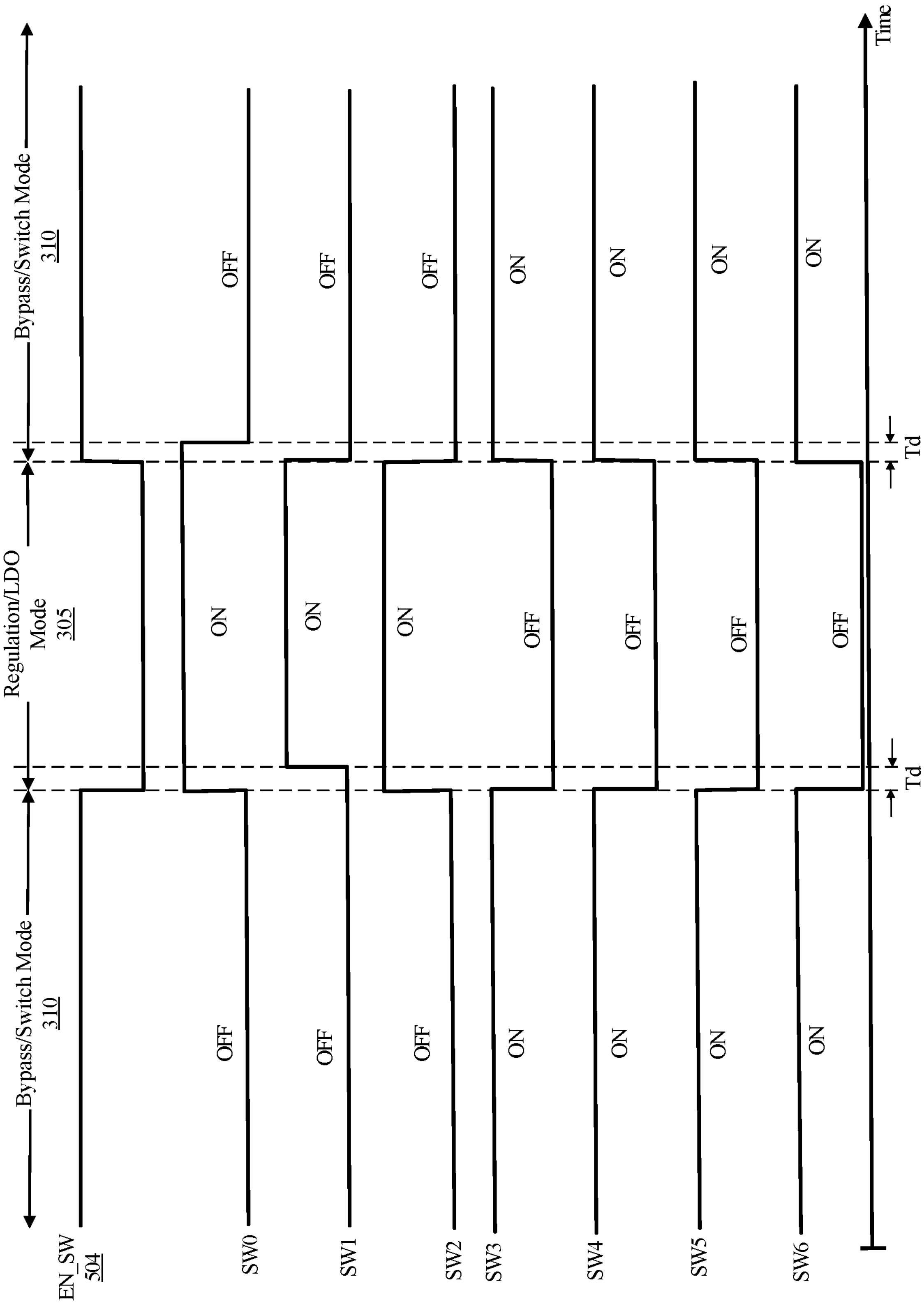
FIG. 6A illustrates timing diagrams of states of switches and a switch mode enable signal in the multi-mode LDO regulator circuit of FIG. 5A and FIG. 5B when the LDO regulator circuit transitions between the regulation/LDO mode and the bypass/switch mode, according to one embodiment.

As shown in FIG. 5A and FIG. 6A, for multi-mode LDO regulator circuit 205 to operate in regulation/LDO mode 305, the switch mode enable signal, EN_SW 504, may be set to, e.g., the defined low voltage value causing that switches SW0, SW1, SW2 are in "ON" states (e.g., closed) and switches SW3, SW4, SW5, SW6 are in "OFF" states (e.g., open). In this manner, the pass transistor, Tpass, is coupled to the feedback loop in LDO regulator circuit 205 as the gate electrode of the pass transistor, Tpass, is coupled (e.g., via the driving circuitry) to the output of operational amplifier 302. Thus, the voltage, $V_{GATE}$, at the gate electrode of pass transistor, Tpass, may be controlled by the feedback loop, and the output voltage, $V_{OUT}$, may be given as $V_{REF}/K$, where K is the feedback factor equal to, e.g., Rf2/(Rf1+Rf2).

Figure 6B:
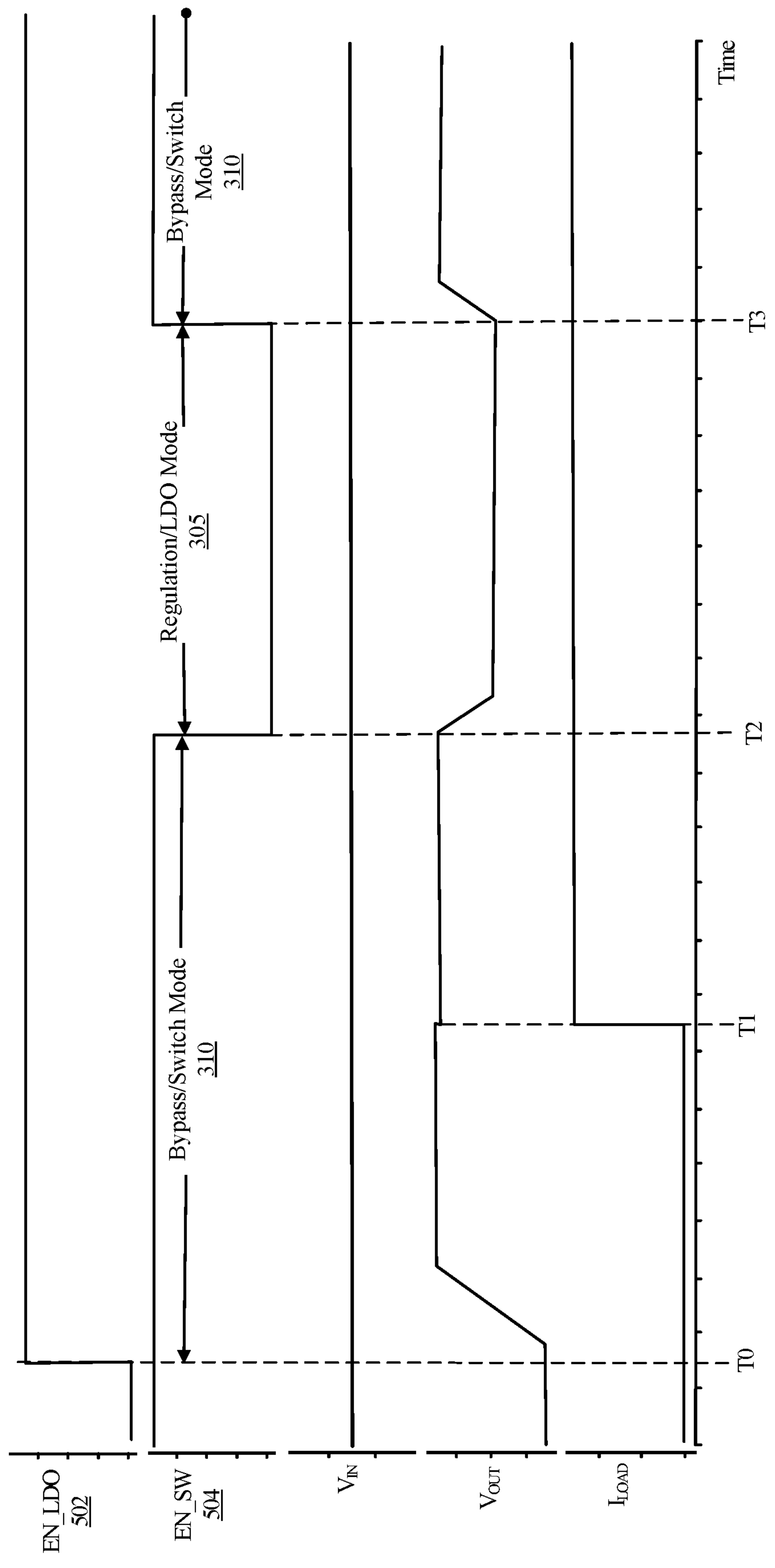
FIG. 6B illustrates timing diagrams of various voltage and current signals in the LDO regulator circuit when the LDO regulator circuit transitions between the regulation/LDO mode and the bypass/switch mode, according to one embodiment.

In addition to the switch mode enable signal, EN_SW 504, that controls states of switches and enables transitions between regulation/LDO mode 305 and bypass/switch mode 310, multi-mode LDO regulator circuit 205 may be also controlled by a LDO enable signal, EN_LDO 502. The LDO enable signal, EN_LDO 502, may be utilized to enable operation (e.g., either in regulation/LDO mode 305 or bypass/switch mode 310) of multi-mode LDO regulator circuit 205 by, e.g., controlling one or more supply voltages to be connected to components of multi-mode LDO regulator circuit 205. The LDO enable signal, EN_LDO 502, may be a bit signal that can have a defined low voltage value (e.g., representing the bit value of "0") and a defined high voltage value (e.g., representing the bit value of "1"). For example (e.g., as shown in FIG. 6B), the operation of multi-mode LDO regulator circuit 205 is enabled (e.g., either in regulation/LDO mode 305 or bypass/switch mode 310) when the LDO enable signal, EN_LDO 502, is set to the defined high voltage value (e.g., equals to "1"). Otherwise, when the LDO enable signal, EN_LDO 502, is set, e.g., to the defined low voltage value, multi-mode LDO regulator circuit 205 may be turned off, e.g., to save power in device 100. The regulation/LDO mode enable signal, EN_LDO 502, may be generated by a component of device 100 separate from multi-mode LDO regulator circuit 205.

Figure 5B:
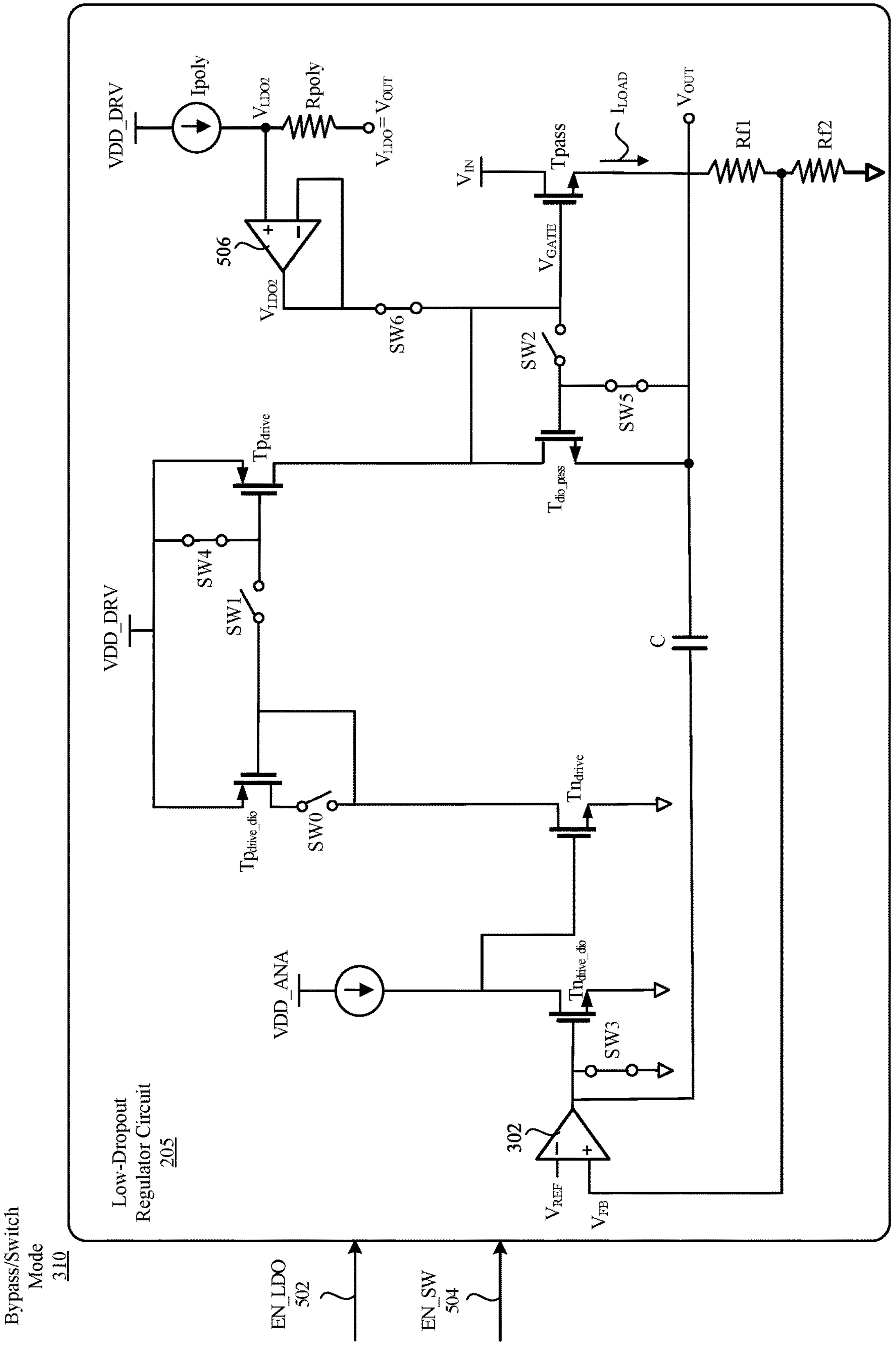
FIG. 5B is a circuit diagram illustrating a multi-mode LDO regulator circuit operating in a bypass/switch mode, according to one embodiment.

FIG. 5B is a circuit diagram illustrating multi-mode LDO regulator circuit 205 operating in bypass/switch mode 310, according to one embodiment. There are two main differences in the configuration of multi-mode LDO regulator circuit 205 in FIG. 5B operating in bypass/switch mode 310 compared to the configuration of multi-mode LDO regulator circuit 205 in FIG. 5A regulation/LDO mode 305. First, by setting switches SW0 though SW6 to be in proper states (e.g., via the switch mode enable signal, EN_SW 504), the pass transistor, Tpass, is disconnected from the feedback loop in LDO regulator circuit 205 as the gate electrode of the pass transistor, Tpass, is disconnected from the output of operational amplifier 302. As further shown in in FIG. 6A, for multi-mode LDO regulator circuit 205 to operate in bypass/switch mode 310, the switch mode enable signal, EN_SW 504, may be set to, e.g., the defined high voltage value causing that switches SW0, SW1, SW2 are in "OFF" states (e.g., open) and switches SW3, SW4, SW5, SW6 are in "ON" states (e.g., closed). As shown in FIG. 6B, for multi-mode LDO regulator circuit 205 to be turned on and operate in bypass/switch mode 310, the LDO enable signal, EN_LDO 502, may be set to the defined high voltage value (e.g., set to "1").

Second, as the switch SW6 is in "ON" state (e.g., closed), the current source Ipoly and operational amplifier 506 are connected to the gate electrode of the pass transistor, Tpass, which causes that a fixed voltage, $V_{GATE}$, is applied to the gate electrode of the pass transistor, Tpass. By properly setting the value of current, Ipoly, and the value of resistance, Rpoly, a voltage Wpm at an output of operational amplifier 506 that also corresponds to the fixed voltage $V_{GATE}$ may be set to a desired value, e.g., the value of $V_{OUT}$+1V. By setting the fixed voltage $V_{GATE}$ to the desired value, it can be ensured that the NMOS pass transistor, Tpass, is turned on (e.g., operates as a switch) and that the output voltage, $V_{OUT}$, is substantially same as the supply voltage (input voltage) $V_{IN}$ that is applied to the drain electrode of the pass transistor, Tpass (since $I_{LOAD}*R_{SW} \ll V_{IN}$). During bypass/switch mode 310, internal operating points of the pass transistor, Tpass, may be set in such a way that there is a minimal undershoot/overshoot whenever LDO regulator circuit 205 transitions to regulation/LDO mode 310 (with/without the load current, $I_{LOAD}$).

FIG. 6A illustrates timing diagrams of states of switches SW0 through SW6 and of the switch mode enable signal, EN_SW 504, in LDO regulator circuit 205 of FIG. 5A and FIG. 5B. As shown in FIG. 6A, responsive to each change of the value of switch mode enable signal, EN_SW 504, each switch SW0 through SW6 transitions from one state to another causing transitioning of LDO regulator circuit 205 from bypass/switch mode 310 (e.g., the configuration of LDO regulator circuit 205 in FIG. 5B) to regulation/LDO mode 305 (e.g., the configuration of LDO regulator circuit 205 in FIG. 5A) and vice versa. As shown in FIG. 6A, a non-overlap time, Td (e.g., Td 5 ns) may be introduced between each state transition of switch SW0 and each state transition of switch SW1. The non-overlap time, Td, may be introduced to avoid a dynamic short circuit current from a supply voltage VDD_DRV during the transition from bypass/switch mode 310 to regulation/LDO mode 305 and vice versa.

FIG. 6B illustrates timing diagrams of various voltage and current signals in LDO regulator circuit 205 when LDO regulator circuit 205 transitions between regulation/LDO mode 305 and bypass/switch mode 310, according to one embodiment. At a time instant T0, the LDO enable signal, EN_LDO 502, may be set to a defined high voltage value (e.g., bit value of "1"), which turns on LDO regulator circuit 205. As the switch mode enable signal, EN_SW 504, has already been set to a defined high voltage value (e.g., bit value of "1"), LDO regulator circuit 205 is set to operate in bypass/switch mode 310 and has the configuration as shown in FIG. 5B. In such case, the output voltage, $V_{OUT}$, is set to increase, e.g., from 0V to the voltage $V_{IN}$ (e.g., $V_{IN}$=1.2V). At a time instant T1, a load may be coupled to the output of LDO regulator circuit 205 (e.g., equivalent to the output capacitance of 2 μF) and the load current, $I_{LOAD}$, increases, e.g., from 0 A to 1.3 A at a rate of 1.3 A/μs. As the load current, $I_{LOAD}$, increases, the output voltage, $V_{OUT}$, may slightly decrease (e.g., from $V_{IN}$ to $V_{IN}-I_{LOAD}*R_{SW}$), but the output voltage, $V_{OUT}$, still remains substantially same as the voltage $V_{IN}$ (e.g., $V_{OUT}$ $V_{IN}\approx$1.2V).

At a time instant T2, the switch mode enable signal, EN_SW 504, changes its value from the defined high voltage value (e.g., bit value of "1") to a defined low voltage value (e.g., bit value of "0"), and LDO regulator circuit 205 transitions from bypass/switch mode 310 (e.g., configuration of LDO regulator circuit 205 in FIG. 5B) to regulation/LDO mode 305 (e.g., configuration of LDO regulator circuit 205 in FIG. 5A). Thus, at the time instant T2, LDO regulator circuit 205 starts operating in regulation/LDO mode 305. Because of that, the output voltage, $V_{OUT}$, decreases from the value of $V_{IN}-I_{LOAD}*R_{SW}$ (e.g., approximately 1.2V) to the regulated output value of $V_{REF}$/K (e.g., approximately 0.55V). It can be observed that when LDO regulator circuit 205 transitions from bypass/switch mode 310 to regulation/LDO mode 305, there is no undershoot in the output voltage, $V_{OUT}$, at full load current, LOAD.

At a time instant T3, the switch mode enable signal, EN_SW 504, changes its value from the defined low voltage value (e.g., bit value of "0") to a defined high voltage value (e.g., bit value of "1"), and LDO regulator circuit 205 transitions from regulation/LDO mode 305 (e.g., configuration of LDO regulator circuit 205 in FIG. 5A) to bypass/switch mode 310 (e.g., configuration of LDO regulator circuit 205 in FIG. 5B). Thus, at the time instant T3, LDO regulator circuit 205 starts operating in bypass/switch mode 310. Because of that, the output voltage, $V_{OUT}$, increases from the regulated output value of $V_{REF}$/K (e.g., approximately 0.55V) to the voltage value of $V_{IN}-I_{LOAD}*R_{SW}$ (e.g., approximately 1.2V). It can be observed that when LDO regulator circuit 205 transitions from regulation/LDO mode 305 to bypass/switch mode 310, there is no overshoot in the output voltage, $V_{OUT}$, at full load current, $I_{LOAD}$.

Example Low-Dropout Regulator with Dropout Detector

Figure 7:
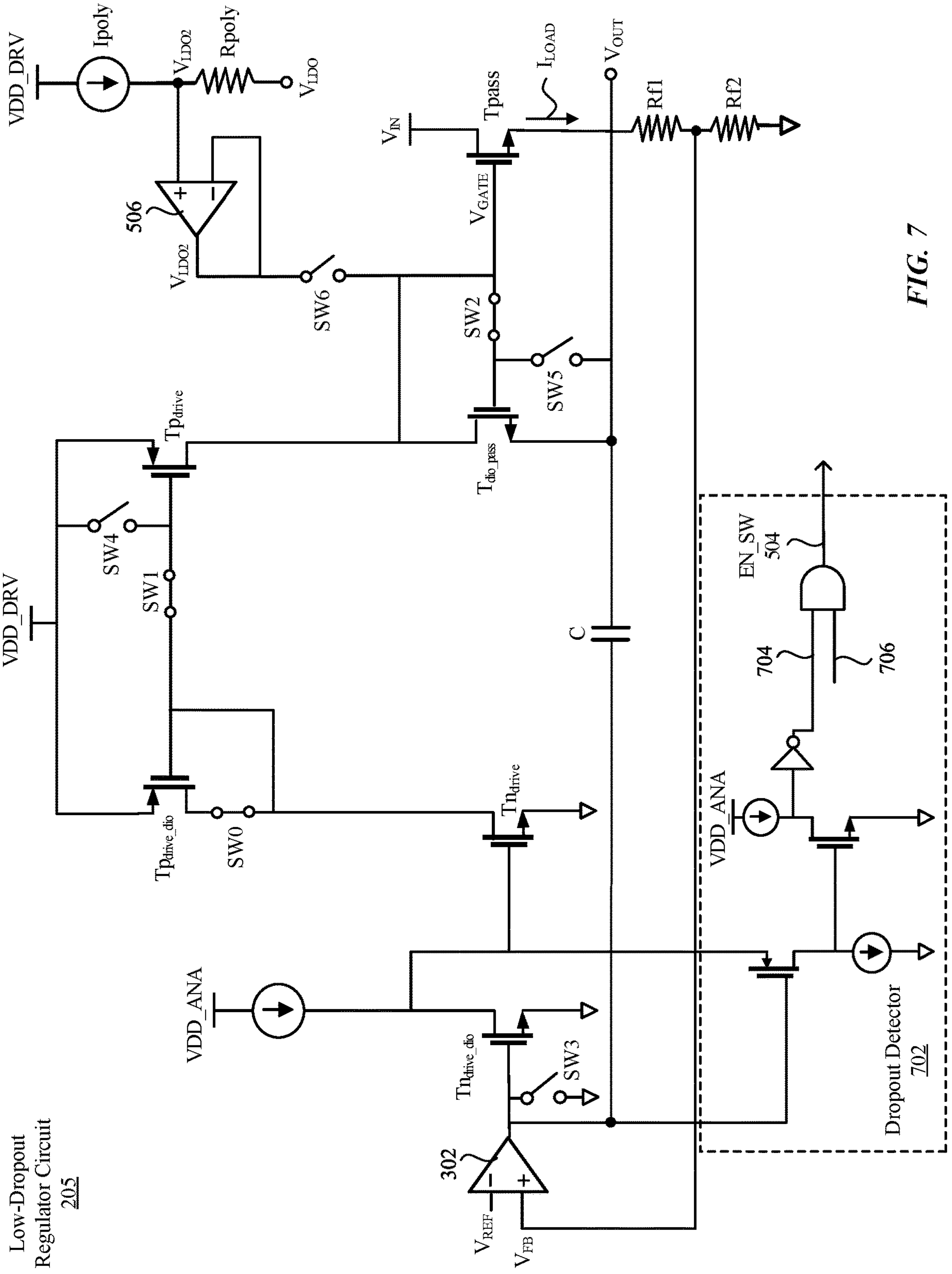
FIG. 7 is an example detailed circuit diagram of a LDO regulator circuit with a dropout detector circuit, according to one embodiment.

FIG. 7 is an example detailed circuit diagram of LDO regulator circuit 205 with a dropout detector circuit 702, according to one embodiment. Except for dropout detector circuit 702, all other components in LDO regulator circuit 205 shown in FIG. 7 are the same as components of LDO regulator circuit 205 in FIG. 5A and FIG. 5B. The configuration of LDO regulator circuit 205 in FIG. 7 (e.g., states of switches SW0 through SW6) corresponds to the configuration of LDO regulator circuit 205 in FIG. 5A, e.g., LDO regulator circuit 205 may operate in regulation/LDO mode 305.

Dropout detector circuit 702 may detect a dropout in the output voltage, $V_{OUT}$, and asserts a dropout flag 704 (e.g., dropout flag 704 becomes "1") in response to detection of the dropout in the output voltage, $V_{OUT}$. If an allow_switchmode flag 706 is set to "1", then the switch mode enable signal, EN_SW 504, may be asserted (e.g., changes its value to the defined high voltage or to the bit value of "1"). In response to the assertion of the switch mode enable signal, EN_SW 504, LDO regulator circuit 205 may transition from regulation/LDO mode 305 to bypass/switch mode 310. Note that allow_switchmode flag 706 set to "0" can disallow transition of LDO regulator circuit 205 from regulation/LDO mode 305 to bypass/switch mode 310. Also, during the dropout in the output voltage, $V_{OUT}$, without any load, there is no back-feeding current from the supply voltage VDD_DRV (e.g., supply voltage of the driving circuitry) to the input voltage, $V_{IN}$.

When dropout detector circuit 702 detects an increase in the output voltage, $V_{OUT}$, dropout flag 704 de-asserts (e.g., dropout flag 704 becomes "0"), the switch mode enable signal, EN_SW 504, also de-asserts (e.g., changes its value to the defined low voltage or to the bit value of "0"). In response to the de-assertion of the switch mode enable signal, EN_SW 504, LDO regulator circuit 205 may transition from bypass/switch mode 310 back to regulation/LDO mode 305.

Figure 8:
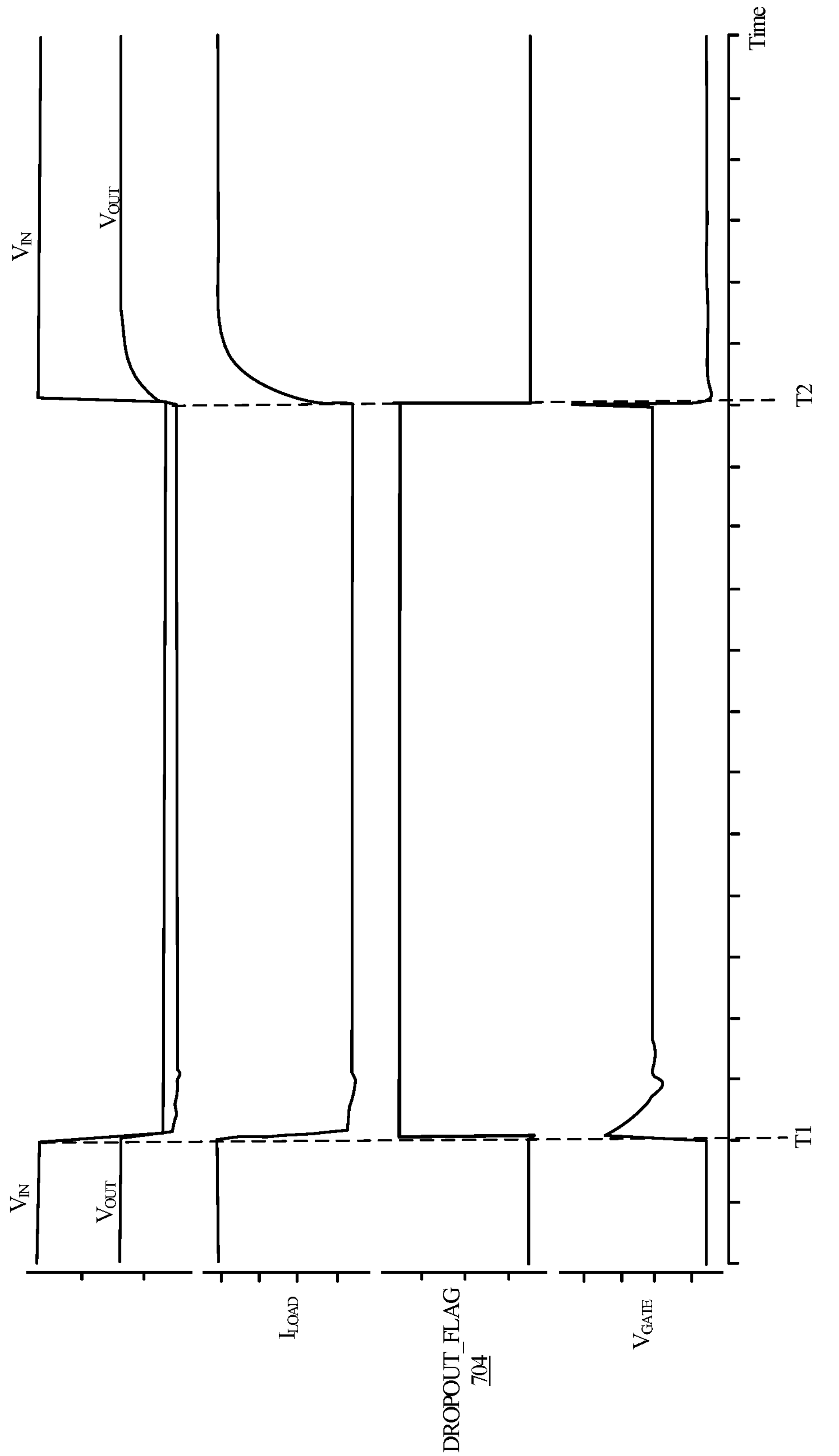
FIG. 8 illustrates timing diagrams of various voltage and current signals in the LDO regulator circuit with the dropout detector circuit of FIG. 7, according to one embodiment.

FIG. 8 illustrates timing diagrams of various voltage and current signals in LDO regulator circuit 205 with dropout detector circuit 702, according to one embodiment. Before a time instant T1, LDO regulator circuit 205 may operate in regulation/LDO mode 305. During regulation/LDO mode 305, the input voltage, $V_{IN}$, may be equal to a first input voltage value (e.g., 1.2V), the load current, $I_{LOAD}$ may be equal to a first load current value (e.g., 1.3 A for the load capacitance of 2 μF), and the output voltage, $V_{OUT}$, may be equal to a first output voltage value (e.g., 1V).

At the time instant T1, the input voltage, $V_{IN}$, may decrease from the first input voltage value to a second input voltage value (e.g., from 1.2V to $V_{OUT}$−100 mV at a rate of 100 mV/μs). Subsequently, the output voltage, $V_{OUT}$, may follow the input voltage, $V_{IN}$, and decrease to a second output voltage value, e.g., to the value of $V_{IN}$−LOAD*$R_{SW}$. At the same time, dropout detector circuit 702 may detect the dropout in the output voltage, $V_{OUT}$, and asserts the dropout flag 704. This further asserts the switch mode enable signal, EN_SW 504, which causes LDO regulator circuit 205 automatic transitioning to bypass/switch mode 310. It can be observed that when LDO regulator circuit 205 automatically transition from regulation/LDO mode 305 to bypass/switch mode 310, there is no undershoot in the output voltage, $V_{OUT}$.

At a time instant T2, the input voltage, $V_{IN}$, may increase from the second input voltage value back to the first input voltage value. As the input voltage, $V_{IN}$, increases, the output voltage, $V_{OUT}$, may also start to increase. Dropout detector circuit 702 may detect an increase in the output voltage, $V_{OUT}$, and dropout flag 704 may be de-asserted (e.g., dropout flag 704 becomes "0"). This further de-asserts the switch mode enable signal, EN_SW 504, which causes LDO regulator circuit 205 automatic transitioning from bypass/switch mode 310 back to regulation mode 305. As LDO regulator circuit 205 now operates in regulation mode 305, the output voltage, $V_{OUT}$, continues to increase back to the first output voltage value (e.g., 1V). It can be observed that when LDO regulator circuit 205 automatically transition from bypass/switch mode 310 back to regulation/LDO mode 305, there is no overshoot in the output voltage, $V_{OUT}$.

Example Process of Operating Low-Dropout Regulator

Figure 9:
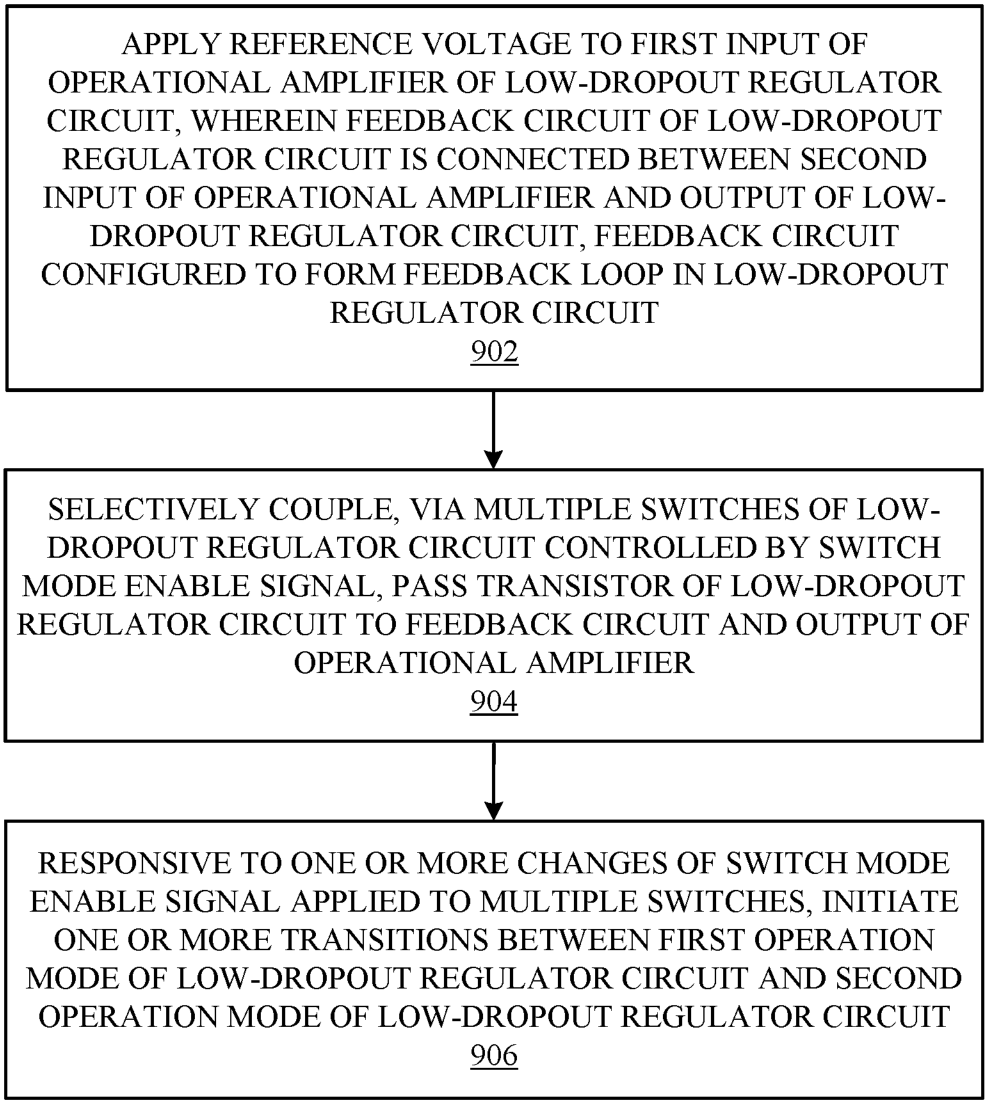
FIG. 9 is a flowchart illustrating a method of operating a LDO regulator circuit, according to one embodiment.

FIG. 9 is a flowchart illustrating a method of operating a LDO regulator circuit (e.g., LDO regulator circuit 205), according to one embodiment. A reference voltage is applied 902 to a first input of an operational amplifier of the LDO regulator circuit, wherein a feedback circuit of the LDO regulator circuit is connected between a second input of the operational amplifier and an output of the LDO regulator circuit, the feedback circuit configured to form a feedback loop in the LDO regulator circuit.

A pass transistor of the LDO regulator circuit is selectively coupled 904, via a set of switches of the LDO regulator circuit controlled by a switch mode enable signal, to the feedback circuit and an output of the operational amplifier. A drain electrode of the pass transistor may be connected to a supply voltage, and a source electrode of the pass transistor may be connected to the output of the LDO regulator circuit. The pass transistor may be implemented as a NMOS transistor.

The LDO regulator circuit initiates 906 one or more transitions between a first operation mode (e.g., LDO/regulation mode 305) of the LDO regulator circuit and a second operation mode (e.g., bypass/switch mode 310) of the LDO regulator circuit, responsive to one or more changes of the switch mode enable signal applied to the switches of the LDO regulator circuit. In the first operation mode, a load voltage (e.g., the output voltage, $V_{OUT}$) at the output of the LDO regulator circuit may have a first voltage value that depends on the reference voltage. In the first operation mode, the load voltage may be generated as a function of the reference voltage and a feedback factor of the feedback loop by connecting a gate electrode of the pass transistor to the feedback loop. In the first operation mode, a voltage at a gate electrode of the pass transistor may be controlled by the feedback loop.

In the second operation mode, the load voltage may have a second voltage value independent from the reference voltage. In the second operation mode, the load voltage may be generated to be substantially same as a supply voltage applied to a drain electrode of the pass transistor by disconnecting the gate electrode of the pass transistor from the feedback loop and applying a fixed voltage to the gate electrode of the pass transistor. The LDO regulator circuit may include a current source configured to generate, in the second operation mode, the fixed voltage applied to the gate electrode of the pass transistor.

In some embodiments, LDO regulator circuit includes a dropout detector circuit coupled to the feedback circuit and the output of the operational amplifier. The dropout detector circuit may be configured to detect a dropout in the load voltage and initiate the one or more changes of the switch mode enable signal responsive to detecting the dropout. The dropout detector circuit may generate a change in the switch mode enable signal for initiating a transition from the first operation mode to the second operation mode, responsive to detecting the dropout. The dropout detector circuit may detect an increase in the load voltage following the dropout and generate another change in the switch mode enable signal for initiating another transition from the second operation mode back to the first operation mode, responsive to detecting the increase in the load voltage. The dropout detector circuit may disallow, based on a bit signal provided to the dropout detector circuit, the transition from the first operation mode to the second operation mode.

Embodiments of the process as described above with reference to FIG. 9 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A low-dropout (LDO) regulator circuit, comprising:

an operational amplifier having a first input connected to a reference voltage;

a feedback circuit connected between a second input of the operational amplifier and an output of the LDO regulator circuit, the feedback circuit configured to form a feedback loop in the LDO regulator circuit;

a pass transistor selectively coupled to the feedback circuit and an output of the operational amplifier via a plurality of switches, wherein the pass transistor comprises a drain electrode connected to a supply voltage; and a dropout detector circuit configured to transition the LDO regulator circuit between a first operation mode and a second operation mode in response to a change in the supply voltage connected to the drain electrode of the pass transistor, wherein:

in the first operation mode, a load voltage at the output of the LDO regulator circuit has a first voltage value that depends on the reference voltage, and in the second operation mode, the load voltage has a second voltage value independent from the reference voltage.

2. The LDO regulator circuit of claim 1, wherein, in the first operation mode, a gate electrode of the pass transistor is connected to the feedback loop, and the load voltage is a function of the reference voltage and a feedback factor of the feedback loop.

3. The LDO regulator circuit of claim 2, wherein, in the first operation mode, a voltage at the gate electrode of the pass transistor is controlled by the feedback loop.

4. The LDO regulator circuit of claim 1, wherein, in the second operation mode, a gate electrode of the pass transistor is disconnected from the feedback loop and a fixed voltage is applied to the gate electrode of the pass transistor.

5. The LDO regulator circuit of claim 4, further comprising a current source configured to generate in the second operation mode the fixed voltage applied to the gate electrode of the pass transistor.

6. The LDO regulator circuit of claim 1, wherein, in the second operation mode, the load voltage is substantially same as the supply voltage applied to the drain electrode of the pass transistor.

7. The LDO regulator circuit of claim 1, wherein a source electrode of the pass transistor is connected to the output of the LDO regulator circuit.

8. The LDO regulator circuit of claim 1, wherein the dropout detector circuit is coupled to the feedback circuit and the output of the operational amplifier and configured to initiate a change in a switch mode enable signal responsive to detecting the a drop in the load voltage due to the change in the supply voltage.

9. The LDO regulator circuit of claim 8, wherein the dropout detector circuit is further configured to generate the change in the switch mode enable signal for initiating a transition from the first operation mode to the second operation mode in response to detecting the drop in the load voltage.

10. The LDO regulator circuit of claim 9, wherein the dropout detector circuit is further configured to:

detect an increase in the load voltage following the drop in the load voltage; and generate another change in the switch mode enable signal for initiating another transition from the second operation mode back to the first operation mode in response to detecting the increase in the load voltage.

11. The LDO regulator circuit of claim 9, wherein the dropout detector circuit is further configured to:

disallow, based on a bit signal provided to the dropout detector circuit, the transition from the first operation mode to the second operation mode.

12. The LDO regulator circuit of claim 1, wherein the pass transistor is an N-type metal-oxide-semiconductor (NMOS) transistor.

13. The LDO regulator circuit of claim 1, wherein the dropout detector circuit comprises:

a first logic device having a first input and a second input, wherein the first input is coupled to control signal representative of allowing the transition of the LDO regulator circuit between the first operation mode and the second operation mode; and a second logic device having an output coupled to the second input of the first logic device, wherein the output of the second logic device is based on the load voltage at the output of the LDO regulator circuit.

14. A method of operating a low-dropout (LDO) regulator circuit, the method comprising:

applying a reference voltage to a first input of an operational amplifier of the LDO regulator circuit, wherein a feedback circuit of the LDO regulator circuit is connected between a second input of the operational amplifier and an output of the LDO regulator circuit, the feedback circuit configured to form a feedback loop in the LDO regulator circuit;

selectively coupling, via a plurality of switches of the LDO regulator circuit, a pass transistor of the LDO regulator circuit to the feedback circuit and an output of the operational amplifier; and transitioning the LDO regulator circuit from a first operation mode to a second operation mode in response to a change in a supply voltage connected to a drain electrode of the pass transistor, wherein:

in the first operation mode, a load voltage at the output of the LDO regulator circuit has a first voltage value that depends on the reference voltage, and in the second operation mode, the load voltage has a second voltage value independent from the reference voltage.

15. The method of claim 14, further comprising:

generating, in the first operation mode, the load voltage as a function of the reference voltage and a feedback factor of the feedback loop by connecting a gate electrode of the pass transistor to the feedback loop.

16. The method of claim 14, further comprising:

generating, in the second operation mode, the load voltage to be substantially same as the supply voltage applied to the drain electrode of the pass transistor by disconnecting a gate electrode of the pass transistor from the feedback loop and applying a fixed voltage to the gate electrode of the pass transistor.

17. The method of claim 14, further comprising:

controlling, in the first operation mode, a voltage at a gate electrode of the pass transistor by the feedback loop; and applying, in the second operation mode, a fixed voltage to the gate electrode of the pass transistor.

18. The method of claim 14, further comprising:

detecting a drop in the load voltage by a dropout detector circuit coupled to the feedback circuit and the output of the operational amplifier; and initiating, by the dropout detector circuit responsive to detecting the drop in the load voltage, one or more changes in a switch mode enable signal.

19. The method of claim 18, further comprising:

generating, by the dropout detector circuit responsive to detecting the drop in the load voltage, the one or more changes in the switch mode enable signal for initiating a transition from a regulation mode of operation to a bypass mode of operation.

20. The method of claim 19, further comprising:

detecting, by the dropout detector circuit, an increase in the load voltage following the drop in the load voltage; and generating, by the dropout detector circuit responsive to detection of the increase in the load voltage, another change in the switch mode enable signal for initiating another transition from the bypass mode of operation to the regulation mode of operation.

21. An electronic device, comprising:

a system memory;

a neural processor circuit coupled to the system memory; and a low-dropout (LDO) regulator circuit having an output coupled to the neural processor circuit, the LDO regulator circuit including:

an operational amplifier having a first input connected to a reference voltage, a feedback circuit connected between a second input of the operational amplifier and the output of the LDO regulator circuit, the feedback circuit configured to form a feedback loop in the LDO regulator circuit, a pass transistor selectively coupled to the feedback circuit and an output of the operational amplifier via a plurality of switches controlled by a switch mode enable signal, wherein the pass transistor comprises a drain electrode connected to a supply voltage, and wherein the LDO regulator circuit is configured to transition between a regulation mode of operation and a bypass mode of operation responsive to one or more changes of the switch mode enable signal, wherein:

in the regulation mode of operation, a load voltage at the output of the LDO regulator circuit has a first voltage value that depends on the reference voltage, and in the bypass mode of operation, the load voltage has a second voltage based on the supply voltage connected to the drain electrode of the pass transistor; and a dropout detector circuit configured to change the switch mode enable signal to cause the LDO regulator circuit to transition between the regulation mode of operation and the bypass mode of operation based on a change in the supply voltage connected to the drain electrode of the pass transistor.

* * * * *